(12) United States Patent
Kent et al.

(10) Patent No.: US 10,019,531 B2
(45) Date of Patent: Jul. 10, 2018

(54) SYSTEM AND METHOD FOR DISPLAYING, CONNECTING AND ANALYZING DATA IN AN ONLINE COLLABORATIVE WEBPAGE

(71) Applicant: Carmel Kent, Ramat-Gan (IL)

(72) Inventors: Carmel Kent, Ramat-Gan (IL); Sheizaf Rafaeli, Haifa (IL)

(73) Assignee: Carmel Kent, Ramat-Gan (IL)

( * ) Notice: Subject to any disclaimer, the term of this patent is extended or adjusted under 35 U.S.C. 154(b) by 327 days.

(21) Appl. No.: 14/280,711

(22) Filed: May 19, 2014

(65) Prior Publication Data

US 2014/0344213 A1 Nov. 20, 2014

Related U.S. Application Data

(60) Provisional application No. 61/825,042, filed on May 19, 2013.

(51) Int. Cl.
| | |
|---|---|
| *G06F 17/00* | (2006.01) |
| *G06F 17/30* | (2006.01) |
| *G06Q 50/00* | (2012.01) |
| *G06Q 10/10* | (2012.01) |

(52) U.S. Cl.
CPC ....... *G06F 17/3089* (2013.01); *G06Q 10/101* (2013.01); *G06Q 50/01* (2013.01)

(58) Field of Classification Search
CPC .... G06F 17/3089; G06Q 10/101; G06C 50/01
USPC ................................................. 707/608, 726
See application file for complete search history.

(56) References Cited

U.S. PATENT DOCUMENTS

| | | | |
|---|---|---|---|
| 7,433,876 B2 | 10/2008 | Spivack et al. | |
| 7,962,326 B2 | 6/2011 | Tsourikov et al. | |
| 8,155,946 B2 | 4/2012 | Hudson et al. | |
| 8,266,154 B2* | 9/2012 | Guo | G06Q 50/01 |
| | | | 707/723 |
| 8,275,796 B2 | 9/2012 | Spivack et al. | |
| 8,332,345 B1* | 12/2012 | Murphy | G06N 5/02 |
| | | | 706/50 |
| 8,442,940 B1* | 5/2013 | Faletti | G06F 17/2785 |
| | | | 704/9 |
| 8,700,555 B1 | 4/2014 | Murphy et al. | |
| 9,361,368 B1* | 6/2016 | Patel | G06F 17/30705 |
| 2005/0204141 A1* | 9/2005 | Sayers | G06F 17/30321 |
| | | | 713/181 |
| 2005/0278325 A1* | 12/2005 | Mihalcea | G06F 17/277 |
| | | | 707/E17.078 |
| 2006/0173957 A1* | 8/2006 | Robinson | G06Q 10/10 |
| | | | 709/204 |

(Continued)

*Primary Examiner* — Phong H Nguyen
(74) *Attorney, Agent, or Firm* — The Roy Gross Law Firm, LLC; Roy Gross (57) ABSTRACT

The subject matter discloses a method for displaying text in a collaborative web platform for discussions, comprising receiving a set of data items to be added to the web page, said set of data items is related to a subject already displayed in the collaborative web page, an object connected to said subject, a relation data unit for defining the relation between the object and the subject and a direction unit for defining the direction of the relation between the object and the subject and automatically adding the received set of data items to a semantic database that represents subjects of the collaborative web page and displaying the set of data items in the collaborative web page.

18 Claims, 5 Drawing Sheets

(56) References Cited

U.S. PATENT DOCUMENTS

| | | | |
|---|---|---|---|
| 2007/0121843 A1* | 5/2007 | Atazky | H04L 51/32 |
| | | | 379/114.13 |
| 2011/0208749 A1* | 8/2011 | Guo | G06Q 30/02 |
| | | | 707/748 |
| 2011/0225293 A1* | 9/2011 | Rathod | G06F 17/30867 |
| | | | 709/224 |
| 2012/0016661 A1 | 1/2012 | Pinkas | |
| 2012/0101806 A1 | 4/2012 | Davis | |
| 2013/0091090 A1 | 4/2013 | Spivack et al. | |
| 2013/0226663 A1* | 8/2013 | Jahid | G06Q 10/1053 |
| | | | 705/7.32 |
| 2014/0108556 A1* | 4/2014 | Abhyanker | G06Q 50/01 |
| | | | 709/204 |
| 2014/0172622 A1* | 6/2014 | Baronshin | G06F 3/0482 |
| | | | 705/26.7 |
| 2014/0222339 A1* | 8/2014 | Abhyanker | H04L 67/18 |
| | | | 701/533 |

\* cited by examiner

SYSTEM AND METHOD FOR DISPLAYING, CONNECTING AND ANALYZING DATA IN AN ONLINE COLLABORATIVE WEBPAGE

BACKGROUND

In many collaborative webpages designed for online discussion and content sharing, such as online forums, data consumption is limited to unstructured data, inputted as free text by users of the collaborative webpages. Shared information in online discussion platforms is organized in linear lists of posts (based on the information organization methods developed in the early 90s bulletin boards). Such information organization makes data retrieval and consumption problematic, both by humans and machines. For example, often in such exchanges a number of different topics or issues may be raised, yet the format of the discourse (i.e., linear thread based discussion) does not support the presentation of a topical split in a conversation. This makes it hard for users to follow their relevant information and maintain a coherent mental model of the discussed topics. In addition, the lack of structure makes it hard for machines and algorithms to make sense, extract aggregated insights and curate knowledge.

Human data consumption may include retrieving, searching, browsing, reviewing, understanding, editing, combining data from multiple sources and the like. For example, a person that enters a collaborative platform or forum focusing on a specific topic may encounter numerous related discussions on the same topic in different locations and different thread written by different contributors in different contexts. Thus the person is unable to compose a mental knowledge model on the specific topic of interest. This will lead to the lack of a meaningful learning process and generally to lack of new knowledge development. The consumption of the unstructured data, for example by textual search, may be according to keywords or a syntactic search. For example, when searching for side effects of a specific drug, a user is likely to input a search query such as "side effects caused by taking drug X right after taking drug Y". There may be millions of results for such search query, most of them are irrelevant since the keyword based search ignores the semantics of the query and domain pre-knowledge, and it is very time consuming for users to reveal the relevant side effects and the relevant relation between the specific side effect and the specific drugs, out of this unfocused list of results. The results are displayed in a serial manner according to relevance criteria of keyword search algorithms, and the absence of contextual relations between the results will be left for the user to manually resolve.

Semantic based engines which are focused on extracting semantic relations and tagging out of human curated unstructured content are based on predefined ontologies, templates and rules (when the domain of knowledge is known in advance), or alternatively on machine learning rules and templates which are assigned by automatics algorithms (when there is a poor definition of the domain knowledge in advance). These approaches are very limited in the accuracy of its semantics extraction methods, and in their ability to adapt to new knowledge domains (which then requires new terminologies and predefined rules), because it is not based on semantic relations, placement of content, and structuring of knowledge, which are curated by humans, and thus can enrich the community's knowledge base with high quality and natural language human curated semantics.

One way to improve information visibility and consumption is to display the information in a concept map. The concept map may improve usability of the information on the web page, for example when collaborating data, studying, analyzing, mapping, understanding, examining and the like. A concept map is a diagram showing the relationships among concepts. It is a graphical tool for organizing and representing knowledge. Concepts, usually represented as boxes or circles, are connected with labeled arrows in a networked-branching hierarchical structure. The relationship between concepts can be articulated in linking phrases such as "gives rise to", "results in", "is required by," or "contributes to".

Concept maps may be used to improve access to content. Concept maps may be generated from a webpage arranged in threads, wherein each stack represents another discussion. The data inputted into the stacks is converted by an entity that purchase the rights for the content into a concept map which is used by the entity to automatically reveal new data from the data inputted as a stack of concepts.

SUMMARY OF THE INVENTION

The present invention enables users in an online discussion group to construct a semi-structured collaborative knowledge base by adding content to a discussion in a more structured manner. In particular, the computerized system of the present invention enables the users to add their posts to a constructed network of posts, where each created post is being added to the network using a specific semantic relation to some other, existing post(s). The relation is chosen or typed by the user who contributes the post to the network as a semantic tag that represents the relation between the old post and the post which is being contributed in a manner which resembles the user's natural language (e.g., "an example of", "reminds me of", "as opposed to"). These human operations are improving the readability of the collaborative knowledge base by humans, while also indicating semantic clues to the inference engine. The inference engine will then be able to infer relations between topics, media instances, and even people (through mentioned topics and relations).

The collaborative semantic map enables navigation and GPS-like orientation in a discussion platform. Users of the semantic network of the subject matter are able to navigate, including zoom-in into topics of interest and zoom-out out of topics which are out of scope, preserve the path of posts they have been browsing through (to maintain a contextual pass to some any specific post), relate between subjects that already appear in the semantic network (but are not necessarily related beforehand), attach content (files, media, video, photos) to various posts and the like. In particular, relations between various subjects, opinions and content pieces of a textual discourse are indicated. In this way, a series of arguments and counter-arguments (for example) can be represented and easily understood visually as opposed to solely textually.

The semantic database mapping the knowledge produced by the contributors is created in a seamless manner while the contributors create posts, couple posts to media, relate between posts, label the posts and relations, view posts and the like. The semantic database maintains a network of posts, in addition to a network of users on top of it, including the relations between the posts and subjects. The user experience of the semantic network is based on a map (network) visualization. The knowledge added by contributors is represented in a new visual manner that avoids linear structures of information organization, such as lists and groups, in such a way that two different posts may be related in more than one way (than as originally constructed).

The present invention also enables to create a social network layer on top of the professional content network which is the content added by contributors of the semantic network. Contributors, commenters and passive viewers are related to the posts and subjects they added, commented on, voted on or viewed, so users and contributors can keep track after one's posts with a specific expertise and area of interest. The social layer over the semantic network allows sending alerts to users of the semantic network according to predefined filters, such as by topic (where an alert can be sent for topics with a direct semantic relation to the requested topic, or by indirect, less obvious, semantic relations), or by a specific contributor.

The present invention also enables users in a collaborative platform to manage discussions in the right context, without being distracted by other unrelated discussions, by constructing each post in its adequate branch/path in the map. Attaching particular topic discussions will target context based search, and enables searching for certain terms in a particular given context, and by that to focus the search. In addition, users of the semantic network will receive alerts on updates only on topics semantically related to discussions that they chose to participate in or to follow.

The present invention also enables to create a semantic database based on natural language schema and community users and based on the user's human actions. The semantic database enables creation of knowledge items, semantic relations between them, interactions between contributors according to items added by those contributors and evaluation of posts and knowledge by the users. The semantic database enables analysis and machine learning, and connecting semantic knowledge items manufactured from different communities or platforms to enable smart connections and access to more sophisticated data produced by the several platforms and communities.

It is another object of the present invention to disclose a method for displaying text in a collaborative web page, comprising: receiving a set of data items to be added to the web page, said set of data items is related to a subject already displayed in the collaborative web page, an object connected to said subject, a relation data unit for defining the relation between the object and the subject and a direction unit for defining the direction of the relation between the object and the subject; automatically adding the received set of data items to a semantic database that represents subjects of the collaborative web page; displaying the set of data items in the collaborative web page.

In some cases, the method further comprises receiving from a contributor of the collaborative web page a relation between two non-related subjects displayed on the collaborative web page. In some cases, the method further comprises receiving a search query that comprises the received object and relation data unit.

In some cases, the method further comprises displaying the set of data items as a search result to the search query, displayed in triplets of subject, object and relation. In some cases, the method further comprises identifying that content added by the contributor qualifies as a post according to a set of predefined rules and suggesting the contributor to convert a comment into a new post.

In some cases, the method further comprises relating the collaborative web page to a second online platform via a link of the second online platform added by a contributor of the collaborative web page.

In some cases, the method further comprises adding content from the link of the second online platform to another semantic database.

In some cases, the method further comprises suggesting an object to be connected to the subject according to the relation data unit, wherein the suggested object is selected from another web page having the same subject.

In some cases, the method further comprises sorting all posts related to a specific post by an impact measure according to data collected for each of the posts from the semantic database, wherein the data comprises community voting for each post, network analysis measurements for each post.

In some cases, the method further comprises representing the semantic database as a map.

In some cases, the method further comprises receiving a navigation instruction from a viewer of the collaborative web page who views the map and updating the display of the collaborative web page according to the navigation instruction.

In some cases, the semantic database comprises a layer of contributors, in order to enable creation of a list of contribution associated with a predefined contributor.

In some cases, the method further comprises aggregating data from multiple computerized platforms into the semantic database. In some cases, the aggregating is performed according to content added by contributors of the collaborative web page. In some cases, the method further comprises identifying trends according to development of the semantic database. In some cases, the method further comprises enabling a manager of the collaborative web page to construct a skeleton of posts using a manager interface.

In some cases, the method further comprises associating a plurality of collaborative web pages into a central semantic database, receiving a search query and provide results to the received search query from at least two of the plurality of collaborative web pages. In some cases, the method further comprises filtering potential posts to be suggested to a viewer of the collaborative web page according to previous posts the viewer visited. In some cases, the method further comprises processing a search query for objects that are related to a specific subject with a specific relation. In some cases, the method further comprises identifying two contributors to the collaborative web page to have similar properties and inferring relations between the two contributors in a social network.

BRIEF DESCRIPTION OF THE FIGURES

The present invention will be understood and better appreciated from the following detailed description taken in conjunction with the drawings. Identical structures, elements or parts, which appear in more than one figure, are generally labeled with the same or similar number in all the figures in which they appear, wherein.

DESCRIPTION OF THE INVENTION

Figure 1:
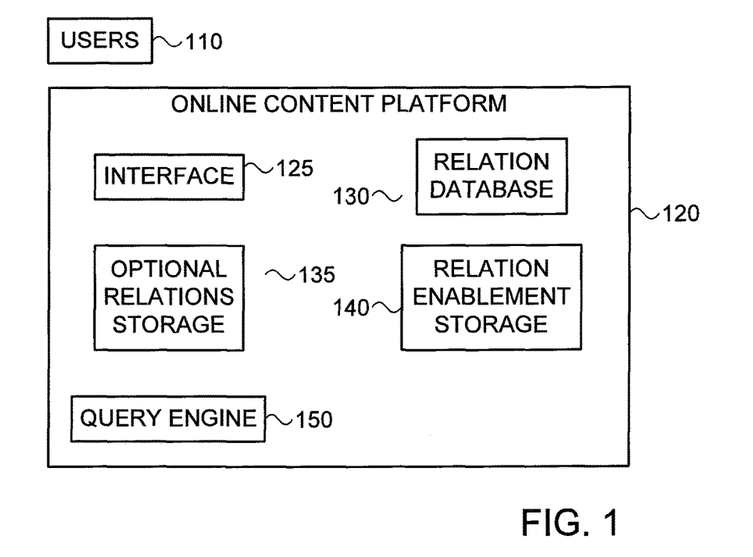
FIG. 1 shows a computerized system for receiving and displaying data in a collaborative web page, according to an exemplary embodiment of the subject matter.

The subject matter discloses a system and method for receiving data, generating data and displaying data in a semantic manner in a collaborative webpage designed for online discussions. In terms of the user's experience, interface, and the client software that resides on the user's computerized device, the method and system of the present invention provides for a map of related posts, each post may contain a set of comments, media attached, votes and information regarding the contributor. The user is browsing the map of posts, and wherever he reads a post A that makes him create any association in his mind, which might lead to writing a new post B—he will be able to create a new post B—related to post A, while semantically describing and tagging the relation between posts A and B. In terms of the engine that runs in the back-end, the method provides for receiving a set of triplets which are curated by the users, in their own language and semantics, that comprise of a subject (comprised from post A), an object (comprised of post B) and a semantic relation (tagged by the contributor) from users of the collaborative web page. FIG. 1 shows a computerized system for receiving and displaying data in a collaborative web page. The data is received from a plurality of users 110 into the system 120 via an interface 125. The interface 125 may be connected to the web page and be configured to receive a predefined set of data items. The set of data items is structured as triplets, each comprises a subject, an object connected to said subject, a relation data unit for defining the relation between the object and the subject and a direction unit for defining the direction of the relation between the object and the subject. The set of data items may also be defined as a query in a semantic web. The interface 125 may receive text inputted by a user of the collaborative web page via a keyboard, a virtual keyboard, a mouse and the like.

The system 120 may also comprise a relation database 130. The relation database 130 stores sets of data units received at the web page. The relation database 130 of one web page (used as the collaborative knowledge base of a certain virtual community) may be associated with a relation database of another web page (used as the collaborative knowledge base of another virtual community), in case there is some linkage through common concepts between the first web page that receives the set of data items the other web page.

The system 120 may also comprise an optional relation storage 135. The optional relation storage comprises options associated with known subjects. For example, in case the web page discloses medications for a specific disease, the optional relation storage 135 comprises a list of medications entered by a person (e.g., the community manager or moderator) or obtained from another database, said list of medications may be suggested to a person that inputs a set of data items into the web page.

The system 120 may also comprise a relation enablement storage 140. The relation enablement storage 140 comprises predefined rules that are applied on the set of data items inputted by the user. For example, a rule of the relation enablement storage 140 will prevent insertion of celebrity names when the relation data unit or object are inappropriate.

The system 120 may also comprise a query engine 150. The query engine 150 enables the user of the web page to input queries that are of a semantic web form that is structured in a triplet form of subject-relation-object. An example of such query is provides in FIG. 3A.

Figure 2:
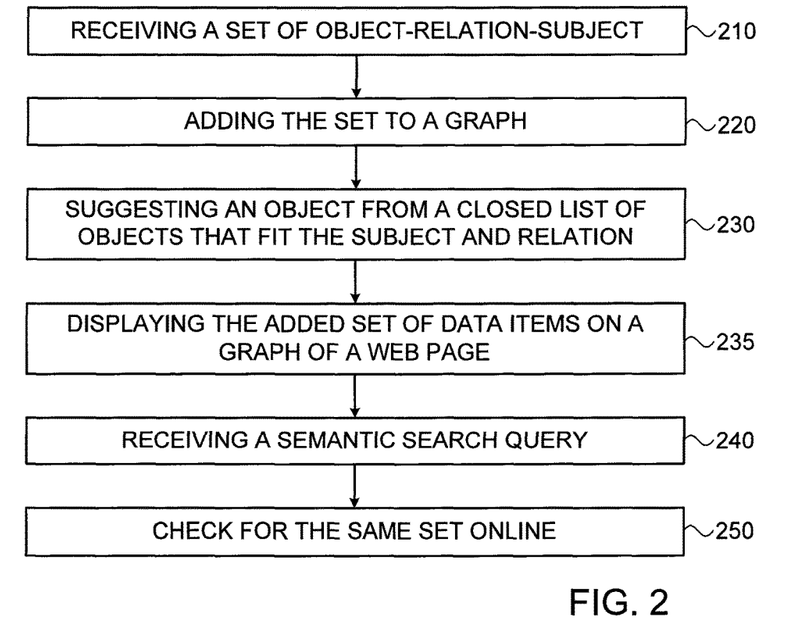
FIG. 2 shows a method for receiving and displaying data in a collaborative web page, according to an exemplary embodiment of the subject matter.

FIG. 2 shows a method for receiving and displaying data in a semantic manner on a web page. In step 210, the method discloses receiving a set of data items into a collaborative web page. The set of data items comprises an object, a subject, a relation data unit and a direction. The direction indicates the relation of the relation data unit between the subject and the object. For example, in case the relation data unit provides for a "daughter", it is ambiguous whether the object is the daughter of the subject or vice versa. The direction provides clearance for the above ambiguity.

Step 220 discloses visually adding the received set of data units into a graph on the web page, such that the set of data units is later displayed in the collaborative web page. The graph may already include either the object or the subject, or both in the case where the user merely contributed a new relation between two existing posts. Adding the set of data units into the graph may include searching for the object or the subject in the graph and adding the set of data units into the graph according to the results of the search. For example, in case the set of data units provides that John Lennon is the subject, Yoko Ono is the object and married is the relation data unit, the method comprises searching for John Lennon and Yoko Ono before adding the set of data units into the graph. In some cases, the method comprises searching for the same relation data unit associated with the object or the subject and displaying the set of data units in close proximity to other relations having the same relation data unit or similar relation data units. For example, when adding an album name of an artist, the relation data unit may be "album" and the method will search for such relation data units of the same artist on the same web page and display the added album close the album name that was added before.

Step 230 discloses suggesting a subject to the user adding the set of data items to the web page. For example, when adding an adverse effect of a specific drug, the method may display a list of known adverse effects (extract from other public knowledge bases) to the user. In addition, in some cases the system may only receive a set of data units that conform to a closed list already stored in the system.

Step 235 discloses displaying the added set of data items on a graph of a web page. Step 240 discloses receiving a search query assembled as a semantic web query. The semantic web query may be in any triplet based form, for example: a subject, a relation data unit and a question mark. Another semantic web query may include a subject, question mark and an object, or may be a chain of subject, relation, object, relation and question mark and the like. The answer to the semantic web query is the entity marked with the question mark. Step 250 discloses searching for a specific set of data items that match to the received semantic web query and displaying one or more sets of data items that comprise an object, a subject and a relation data unit added to a graph on a web page.

Figure 3A:
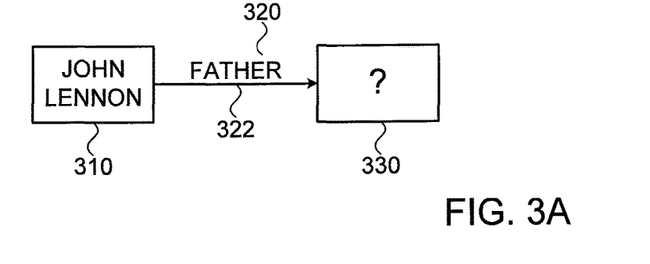
FIG. 3A shows a semantic web query, according to an exemplary embodiment of the subject matter.

FIG. 3A shows a semantic web query, according to an exemplary embodiment of the subject matter. The semantic web query comprises a subject 310, a relation data unit 320, a direction 322 and an unknown entity 330 marked by a question mark. The subject 310 is John Lennon and the relation data unit 320 is "father". As the direction 322 points from the subject 310 towards the unknown entity 330, the unknown entity 330 refers to the father of John Lennon. If the direction 322 points from the unknown entity 330 towards the subject 310, the unknown entity 330 refers to the son of John Lennon, as Lennon refers to the father.

Figure 3B:
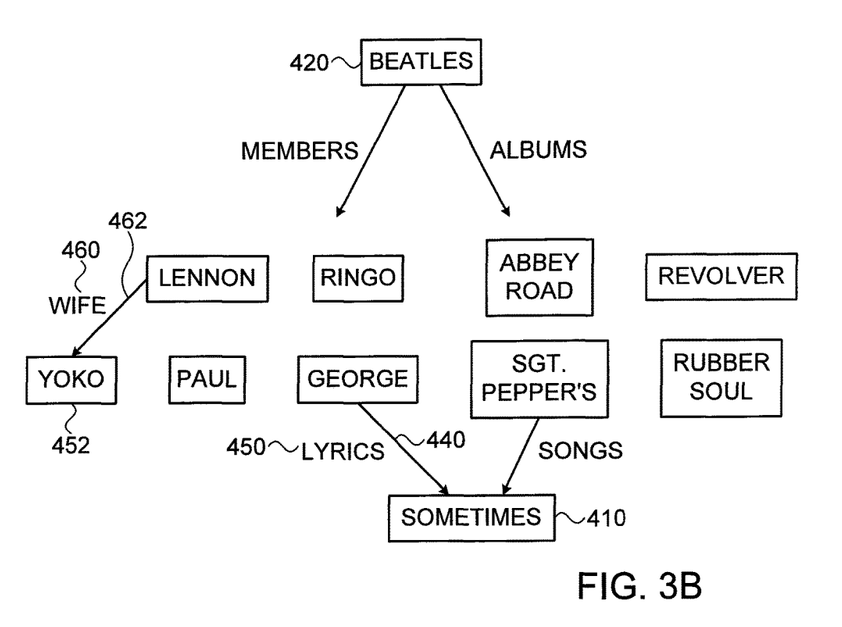
FIG. 3B shows a graph on a web page having sets of data units, according to an exemplary embodiment of the subject matter.

FIG. 3B shows a graph on a web page having sets of data units, according to an exemplary embodiment of the subject matter. The graph comprises various items connected therebetween. The graph includes a first object 420 indicating the Beatles. A first relation data unit indicates the members and connects the Beatles 420 to Lennon, Ringo, Paul and George. A second relation data unit indicates the Beatles albums. A third relation connects one of the albums to a name of a song included in the album. Users of the web page input the sets of data units. For example, at the beginning only the Beatles 420 is displayed on the web page. Then, users add various data units, for example adding the albums as a relation data unit and add album names to be connected to the Beatles via the appropriate relation data unit. In some cases, a user just adds a relation data unit between two objects displayed on the web page. For example, the song "sometimes" 410 is already displayed and is connected to a certain album. Then, a user connects the song to the person who wrote the lyrics. The relation data unit lyrics 450 is added as well as the direction 440. Such relation may be performed by dragging an object from the graph to an interface unit which enables users to add data units to the graph, or to add relations between two objects that are already displayed on the graph. In another example, a relation data unit "wife" 460 is added with a direction 462, connecting Lennon to Yoko 452. The direction 462 indicates that Yoko is the wife, not John.

In some exemplary cases, the method of the subject matter comprises assigning a value to a subject of the graph displayed on the web page. In other cases, a value may also be assigned to a participant that contributed content to the graph, for example according to additional semantic data sets contributed to a subject inputted by a specific participant or contributor. In some other cases, elements in the graph, such as subjects and relations, may be marked to identify the participant who added them, for example by changing font size or color of the content. The method may also reveal search results that associated between subjects and objects of a pair of users. For example, in case one user wishes to find all the relations between subjects he added and objects that were added by another specific user. The steps disclosed above are based and enabled by the fact that the users' contributions are structurally.

In some exemplary cases, the method of the subject matter comprises generation of semantic web based XMLs that are ready for further mining. Since the generated concept map is persisted as a graph database, the concept map is exported by request to a standard semantic web based representation (such as W3C RDF), where each entity (e.g., post, subject, relation, person, vote, comment) is assigned a unique URI by the system. This URI enables the engine to relate those entities, which were raised by the users during the discussion, to external semantic web databases (e.g., published online database which maps drugs to various side effects), DBPedia (a semantic database derived from the Wikipedia knowledge base etc.). The standard semantic web based representation can then be further used to expand the knowledge base, connect different communities" knowledge bases and by data mining services, inference tools and semantic search engines to extract more insight and knowledge out of the generated concept maps.

The elements of the graph may be associated by attachment with media objects, such as images, videos, notes, chat, URLs relevant to it and the like. The media files may be available only upon mouse over or by pressing on the subject.

Figure 4:
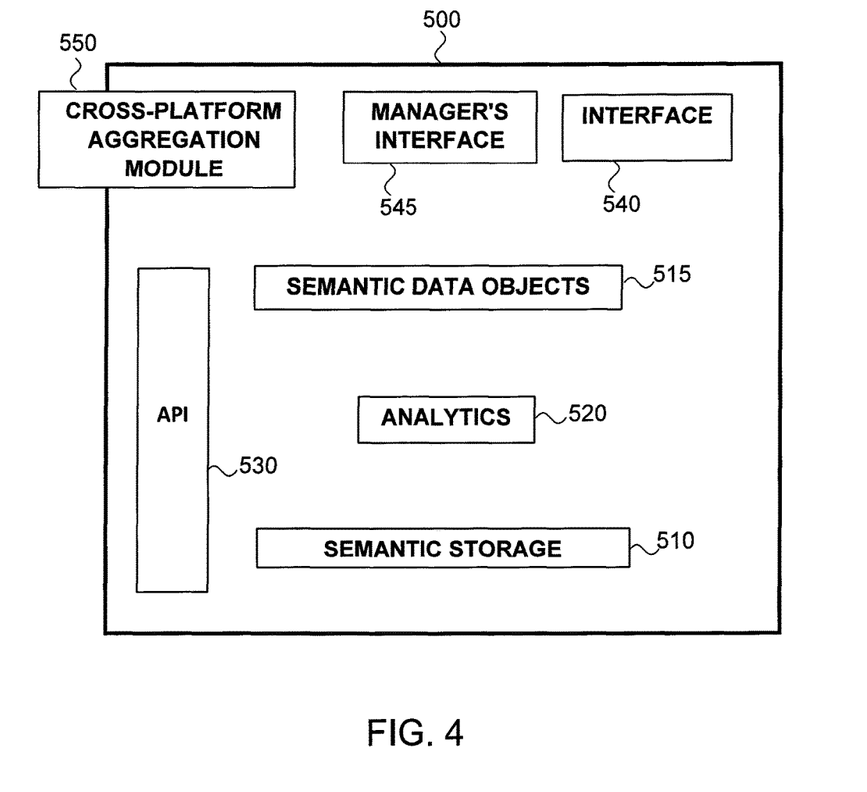
FIG. 4 shows a computerized system for analyzing semantic content added to a collaborative web page, according to exemplary embodiments of the subject matter.

FIG. 4 shows a computerized system for analyzing semantic content added to a collaborative web page, according to exemplary embodiments of the subject matter. The system 500 comprises an interface 540 for contributors of data sets into the collaborative data sets. The interface 540 enables participants to contribute triplets of subject-relation-object in the context of a live discussion. The triplets may comprise the users' own human curated defined semantic relations between items, arguments, opinions and knowledge items. The interface 540 also enables the users to add new relations between couples of non-related existing entities (subjects), to rank triplets, to be identified according to the content added by each contributor and the like. The interface 540 also enables participants or other users of the collaborative web page to navigate in the web page, view a map of semantic relations, zoom-in, zoom out, search for content added by a specific participant, search for a predetermined triplet of subject-relation-object, filter for lists of objects which are related to some given subject in a specific relation, for example input a search query for all objects that are related to drug X with the relation 'caused', input a query for a portion of a triplet (as shown in FIG. 3A) and the like. In addition, the interface 540 enables the users to comment on specific subjects, identifying that the content added by the contributor is more than a simple comment according to a set of predefined rules and suggesting the contributor of some comments which are being suspected by the engine to add new value to the knowledge base—to convert their comment into a new post, and add a semantic relation between this new post and the original (commented-on) post. Thus, adding more user generated semantics to the system. The interface enables users to choose whether to add a post which is related to another post, or add a comment to a post. The difference between a post and a comment may be that other users cannot relate to a comment but can add a comment to a post. In some cases, the size of a comment is limited to a predefined number of characters, or cannot be associated with a link or media.

The system 500 comprises a manager's interface 545 for managers of the collaborative web page. The manager's interface 545 enables managers of the collaborative web page to verify that contributions to the web page are in the form of a triplet, as disclosed above. The manager's interface 545 may also enable the managers to filter content according to a predefined set of rules, for example input of inappropriate content. The manager's interface 545 may provide contributors of the collaborative web page with options on how to add content, for example, according to a name of the subject. The suggestion may be done according to the contributor's identity and relatedness of the contributor to other contributors. The manager's interface 545 may also help the manager to detect new posts which are actually a duplication of existing posts, or such that should be related or referred to existing posts. The manager's interface 545 will also enable the manager to monitor the discussion topics map in real time, this encountering events of a massive discussion over some specific subject, the raise of new trends that should be attended by the manager, and to encounter opinion leaders (i.e., contributors of posts which are determined as central and have many relations within the graph database).

The system 500 comprises a semantic storage 510. The semantic database 510 is structured according to the data sets contributed by contributors of the collaborative web page, and enriched by other external semantic web based online databases. For example data sets as disclosed in FIGS. 3A and 3B. In addition to storing the data sets as inputted by the contributors, the semantic storage 510 generates additional connections between subjects inputted by contributors, for example according to inter-related objects. The semantic storage 510 is updated in real time by each contribution, view, voting or browsing—through each piece of information inputted by users of the collaborative map. The real time update of the semantic storage 510 enables the just-on-time structuring of content, and the execution of rules which are pre-defined (e.g., "alert on any new side effect of drug X which is somehow related to a headache") of inferred by machine learning (e.g., posts which are up to 3 relations away from any entity mentioning president Obama healthcare reform has a positive sentiment in a probability of 0.7).

The system 500 comprises an API module 530. The API module 530 may be used by third party analyzing tools when analyzing the content of the semantic storage 510. The third party analyzing tools might comprise of search engines which benefit from semantic tagging for SEO purposes and social text analytics tools. The analytics tools may include social monitoring, brand monitoring, and commercial analytics searching for brands, products or other entities with some context, sentiment or relation to other entities, for example searching for Nike's new running shoes in the context of the May marathon in Paris, with a negative sentiment by young women, or massively related to some new design by New Balance new running shoes.

The system 500 comprises an analytics module 520. The analytics module 520 analyzes the data of the semantic storage 510, according to algorithms and rules stored in the analytics module 520. The analytics module 520 may perform content analytics, brand advocacy, behavioral analysis, for example extract information from navigational paths, e.g., crowded paths & similarities among navigators, extract context from which topics were raised. The analytics module 520 may perform analysis according to contributors, identify social media buzz, generate social network segmentation, identify which members were connected implicitly with other members, through which topics, for example for customer segmentation. The analytics module 520 may perform knowledge discovery, perform contextual search or semantic search. The analytics module 520 may perform analytical dashboard for the community managers to analyze Impact scores: level of interactivity, level of involvement, degree of centrality, &community voting, 'hot topics', 'hot contributors', trends, content enrichment and the like.

The system 500 comprises a semantic data objects creation (SDOC) unit 515. The SDOC unit 515 is configured to translate data added into the collaborative web page into the semantic storage 510. The data added into the collaborative web page comprises triplets, ranks of content added to the web page, comments, links to other web pages and the like.

The data added to the semantic storage 510 may also comprise associating content according to the contributor who added each data set.

The system 500 comprises a social media unit 555. The social media unit 555 connects data from the semantic storage 510 with data from a social network, or adds data from a social network into the semantic storage 510. The social media unit 555 may identify posts or discussions in a social network that are associated with a contributor of content at the semantic storage 510. The social media unit 555 may then add the content of the same contributor to search results when a query concerning the specific contributor is received at the semantic storage 510. The social media unit 555 may identify data sets in the form of triplets that are added to discussions in a social network and add them to the semantic storage according to the subject of the social network discussions and subjects that are already stored in the semantic storage.

The system 500 comprises a visual navigation unit 560. The visual navigation unit 560 enables users of the system 500 to view the content of the semantic network in a more intuitive and efficient manner. The visual navigation unit 560 shows data of the semantic database 510 in a representation of a semantic network viewed as a map. The visual navigation unit 560 enables users who view the semantic network to navigate in the semantic network, for example enables zoom-in, zoom-out, adding new relations between subjects that already appear in the semantic network. The relation added between two subjects that already appear in the semantic network may change the display of the semantic network.

The system 500 comprises a cross-platform aggregation (CPA) module 550. The system 500 may contain information received from contributors of several independent platforms, for example a first platform is a collaborative web page on medicine and another platform is about sports injuries. The several platforms may be in different languages, may be associated with different educational institutions, and the like. The CPA module 550 extracts data from the several independent platform to identify new relations between subjects that appear in the several platforms. The CPA module 550 may also aggregate content from the several platforms and send the aggregated content to the analytics module 520 when there is a need for more information in order to achieve more stable results, for example in case the amount of content in a specific discussion or on a certain subject is less than a predefined threshold.

Figure 5:
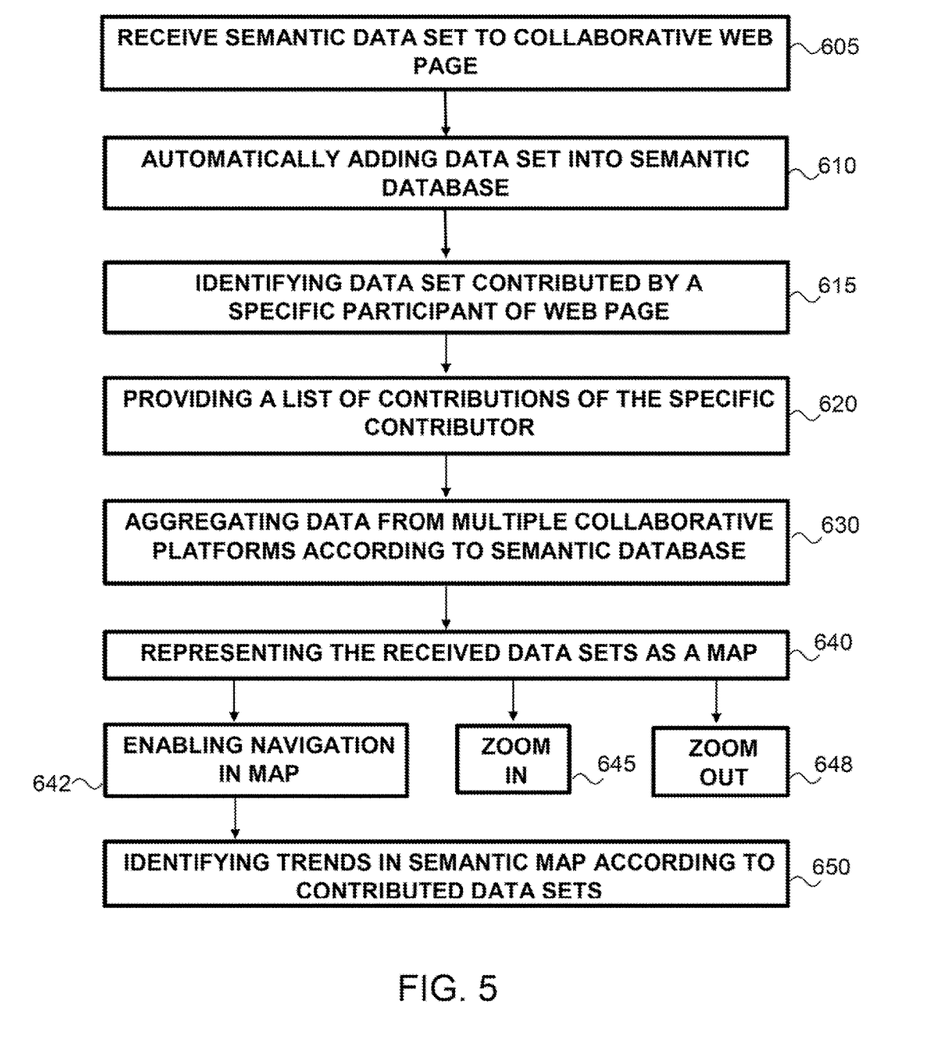
FIG. 5 shows a computerized method for analyzing semantic content added to a collaborative web page, according to exemplary embodiments of the subject matter.

FIG. 5 shows a computerized method for analyzing semantic content added to a collaborative web page, according to exemplary embodiments of the subject matter. Step 605 discloses receiving a semantic data set from a contributor to a collaborative web page. The semantic data set may be a post in response to an item already posted to the collaborative web page, a response in a discussion, additional data relevant to a subject discussed in the collaborative web page, a passive view of any item, and the like. In some exemplary cases, the semantic data set is a new relation between two subjects that already appear in the collaborative data set, as the new connection is defined by the contributor.

Step 610 discloses automatically adding the received semantic data set into a semantic database. The addition is performed in real time, using automatic software tools which translate the semantic data set into semantic representation of the semantic database. The addition may be performed by an adaptive creator of semantic content, such as The SDOC unit 515.

Step 615 discloses identifying a set of data items contributed by a specific contributor of the collaborative web page. Identification of the contributor enables generation of contributions of a specific contributor 620, in order to create another layer to the semantic network in which each contributor is defined by his own posts, responses, votes, views and his posts' place in the network (i.e., how central and strongly-connected they are). The new layer enables users of the collaborative web page to perform searches based on the contributors' identity.

Step 630 discloses aggregating data from multiple platforms (whether curated by the same method or curated manually or automatically for other semantic databases) into the semantic network. The aggregation may be performed automatically, in order to increase the amount of data associated with a specific content and improve analytics for the same topic. The multiple platforms may be of various subjects, with different contributors, in a different language and the like.

Step 640 discloses representing the semantic network as a semantic map. The map comprises nodes which are the posts or subjects contributed by the contributors of the semantic network. The edges are relations contributed by the contributors when adding the posts. The contributors may add relations between two posts or subjects that already appear in the semantic network. In such a case, the visual representation of the semantic network is updated according to the new relations added to the two subjects and additional relations that are created responsive to the new relation. Dominant posts (by voting or by centrality measures) will be highlighted.

Step 642 discloses enabling navigation in the semantic network. The navigation includes zoom-in 645, zoom-out, 648, moving from content of one platform to content of another platform, processing queries related to a specific contributor and the like.

Step 650 discloses identifying trends in the semantic network according to data sets contributed into the semantic network. Specific entities, subjects, people, places, events etc. which are mentioned in the posts will be emphasized to the manager or analytics consumer wherein those entities are mentioned widely unexpectedly, whether they are mentioned in critical (central, gatekeepers etc.) places in the network of posts, related to contributors who were identified as opinion leaders by the system (by high central, betweenness, and connectedness measures for example), or identified as related by some unexpected context (e.g., mentioned heavily with negative relations to some other central entity in the network).

Figure 6:
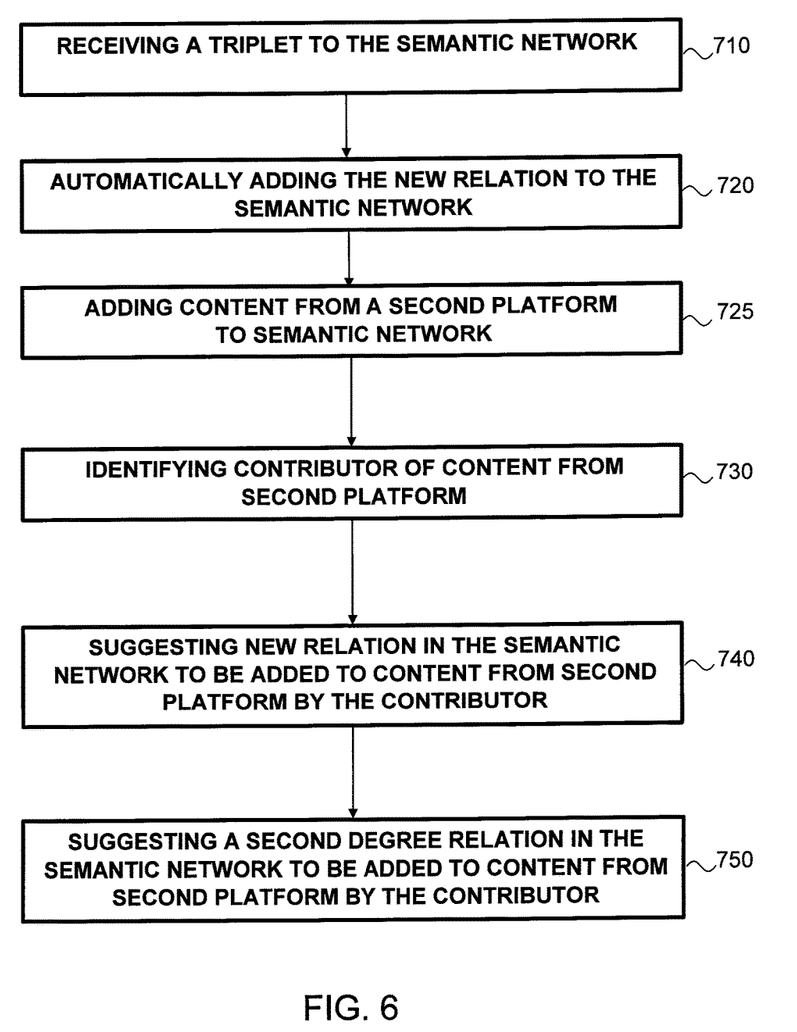
FIG. 6 shows a method of sharing and analyzing information from multiple collaborative platforms, according to exemplary embodiments of the disclosed subject matter.

FIG. 6 shows a method of sharing and analyzing information from multiple collaborative platforms, according to exemplary embodiments of the disclosed subject matter. In step 710, a triplet is added to the semantic network. The triplet comprises a relation to an older post and the post itself, for example the previous post is "wiki sexism", the relation is "towards" and the new post is titled "women novelists". The system automatically creates a link to a list of "women novelists" from an external knowledge base (in this example, from Wikipedia). Then, in step 720, the new relation is automatically added to the semantic network of the present invention. In step 725, the women's list from Wikipedia page is added to the semantic database and enriches it, linked to the discussion. In step 730, the interface of the system identifies that the user who added the triplet linked to the list from Wikipedia browsed to "wiki sexism" via "women in Wikipedia" and then to "gender bias" topics. Then, in step 740, a relation is suggested to the person who added the triplet, or to any content consumer, to connect between one of the novelists and wild sexism. In step 750, the system also suggests the contributor to connect one of the novelists and "gender bias".

The present invention may be used to associate people in a social network according to actions and posts added by two contributors to the semantic network. The system of the present invention identifies similarity in the content and comments of two contributors and infers relations between those two persons in the network, just from the fact they have participated (actively by contributing or passively by voting/viewing) in the same areas in the network. This is based on an interest resemblance that you find between two people just from analyzing the location of their posts in the network/graph database, and from following their browsing paths in the graph. This way the system of the present invention could also point to 'opinion leaders', those who's posts are very connected and are mainly in the central of the network.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A computer-implemented method, comprising:
obtaining semantic data related to a plurality of items from collaborative web page interconnected in a network, wherein a portion of items of said plurality of items are uploaded to said collaborative web page by multiple contributors using said collaborative web page, and wherein the portion of the items is assigned to said multiple contributors which uploaded the portion of the items to the collaborative web page;
adding to a semantic network comprising semantic relations between said plurality of items:
semantic data on said portion of items, wherein said semantic data obtained from semantic tags which represent the relations between the portion of items and the plurality of items,
wherein the semantic tags are provided by contributors to which the portion of items is assigned, and wherein the semantic data is added to the semantic tags in a manner which resembles the user's natural language,
direction units associated with said plurality of items, wherein said direction units are defining the directions of the relations among said plurality of items and the portion items;
updating a social network layer of users, said layer of users is created on top of the collaborative web page, wherein said users further use collaborative platforms configured to post textual discussions on said plurality of items, in a manner which resembles the user's natural language;
adding a semantic database to the semantic network according to subjects, comments, content of the textual discussions, and according to semantic tags added to said textual discussions, wherein said textual discussion are added to said collaborative platforms, wherein said textual discussions are inputted into the collaborative web page in a manner which resembles the user's natural language, and wherein said textual discussions are provided by users and contributors of said collaborative platforms;

analyzing said semantic network and providing social information related to the contributors and users of said collaborative platform and semantic information related to the plurality of items uploaded to said collaborative web page;

visualizing the semantic network to said users and said contributors, wherein the visualization comprises the semantic relations between said plurality of items, the direction units of said plurality of items, said social information, and said semantic information; and representing the semantic database as a map showing relationships among items in the collaborative web page configured to enable a user to navigate between topics in the collaborative web page.

2. The method of claim 1, further comprising receiving from a user of the plurality of users a relation between two non-related items existing on the collaborative web page and adjusting location of at least three items in the network in response to the new connection between two existing items.

3. The method of claim 1, further comprising receiving a search query that comprises the new item and the relation.

4. The method of claim 3, further comprising displaying a set of data items as a search result to the search query, displayed in triplets of existing item, new item and relation.

5. The method of claim 1, further comprising identifying that the new item added by the contributor qualifies as a post according to a set of predefined rules and suggesting the contributor to convert a comment into a new post.

6. The method of claim 1, further comprising relating the collaborative web page to a second online platform via a link of the second online platform added by a contributor of the collaborative web page.

7. The method of claim 6, further comprising adding content from the link of the second online platform to another semantic database.

8. The method of claim 1, further comprising measuring an impact of an item in the collaborative web page according to data collected for each of the items in the semantic database.

9. The method of claim 8, further comprising analyzing impact scores of users in the collaborative web page according to the impact score of items in the collaborative web page.

10. The method of claim 1, further comprising receiving a navigation instruction from a viewer of the collaborative web page who views the map and updating the display of the collaborative web page according to the navigation instruction.

11. The method of claim 1, further comprising identifying a content in the new item;
searching for a webpage of another computerized platform associated with the identified content; aggregating data from multiple computerized platforms into the semantic database.

12. The of to claim 1, further comprising identifying trends in the collaborative web page in response to addition of the new item to the semantic database.

13. The method of claim 1, further comprising associating a plurality of collaborative web pages into a central semantic database, receiving a search query and provide results to the received search query from at least two of the plurality of collaborative web pages.

14. The method of claim 1, further comprising processing a search query for objects that are related to a specific subject with a specific relation.

15. The method of claim 1, further comprising identifying two users to the collaborative web page to have similar properties according to navigational paths of the two users in the collaborative web page.

16. The method of claim 1, wherein the relation comprises a semantic tag that represents the relation between the existing post and the new post in the user's natural language.

17. The method of claim 1, wherein the semantic network further comprises a layer comprising the contributors, further comprises defining the contributors according to responses of said contributors.

18. The method of claim 17, further comprising adding relations between two posts, wherein said posts are already in the semantic network.

* * * * *